US011143665B2

(12) United States Patent
Yasui et al.

(10) Patent No.: US 11,143,665 B2
(45) Date of Patent: Oct. 12, 2021

(54) AUTOMATIC ANALYZER (71) Applicant: HITACHI HIGH-TECHNOLOGIES CORPORATION, Tokyo (JP)

(72) Inventors: Akihiro Yasui, Tokyo (JP); Gorou Yoshida, Tokyo (JP); Yoshiki Muramatsu, Tokyo (JP); Isao Yamazaki, Tokyo (JP)

(73) Assignee: HITACHI HIGH-TECH CORPORATION, Tokyo (JP)

(*) Notice: Subject to any disclaimer, the term of this patent is extended or adjusted under 35 U.S.C. 154(b) by 200 days.

(21) Appl. No.: 16/331,594

(22) PCT Filed: Sep. 14, 2017

(86) PCT No.: PCT/JP2017/033331
§ 371 (c)(1),
(2) Date: Mar. 8, 2019

(87) PCT Pub. No.: WO2018/056180
PCT Pub. Date: Mar. 29, 2018

(65) Prior Publication Data
US 2019/0361042 A1    Nov. 28, 2019

(30) Foreign Application Priority Data
Sep. 21, 2016  (JP) .............................. JP2016-184267

(51) Int. Cl.
*G01N 35/02*    (2006.01)
*G01N 35/00*    (2006.01)
(Continued)

(52) U.S. Cl.
CPC ..... *G01N 35/025* (2013.01); *G01N 35/00722* (2013.01); *G01N 35/1081* (2013.01);
(Continued)

(58) Field of Classification Search
CPC ........... G01N 35/025; G01N 35/00722; G01N 35/1081; G01N 2035/009;
(Continued)

(56) References Cited

U.S. PATENT DOCUMENTS 5,499,545 A * 3/1996 Kimura ................. B01L 3/0227
222/55
2008/0011042 A1    1/2008 Molitor et al.
(Continued)

FOREIGN PATENT DOCUMENTS

| JP | S2-178787 A | 8/1987 |
|---|---|---|
| JP | 08-220106 A | 8/1996 |

(Continued)

OTHER PUBLICATIONS

Extended European Search Report received in corresponding European Application No. 17852953.3 dated Mar. 23, 2020.

*Primary Examiner* — Samuel P Siefke
*Assistant Examiner* — Henry H Nguyen
(74) *Attorney, Agent, or Firm* — Mattingly & Malur, PC (57) ABSTRACT

An automatic analyzer (100) includes: a storage unit (21b) that stores various parameters of the automatic analyzer (100) in association with each of elevations used in the automatic analyzers (100), the parameters being optimized for each of the elevations; an input unit (21d) that acquires information of an elevation at which the automatic analyzer (100) is provided; and a controller (21a) that reads the parameters stored in the storage unit (21b) and sets the read parameters to the automatic analyzer (100) based on the elevation acquired by the input unit (21d). As a result, various parameters can be easily adjusted according to a usage environment of the device.

5 Claims, 6 Drawing Sheets

(51) Int. Cl.
*G01N 35/10* (2006.01)
*G01N 35/04* (2006.01)

(52) U.S. Cl.
CPC .................. *G01N 2035/009* (2013.01); *G01N 2035/00702* (2013.01); *G01N 2035/0432* (2013.01); *G01N 2035/0443* (2013.01); *G01N 2035/0444* (2013.01)

(58) Field of Classification Search
CPC ... G01N 2035/0432; G01N 2035/0443; G01N 2035/0444; G01N 2035/00702; G01N 35/00584
See application file for complete search history.

(56) References Cited

U.S. PATENT DOCUMENTS

2013/0067988 A1   3/2013   Aoki et al.
2013/0311243 A1*  11/2013  Taki .................. G01N 35/0092
                                                             705/7.38

FOREIGN PATENT DOCUMENTS

| JP | 9-43220 A | 2/1997 |
| JP | 11-258244 A | 9/1999 |
| JP | 2008-020442 A | 1/2008 |
| JP | 2009-278849 A | 11/2009 |
| JP | 2013-68443 A | 4/2013 |
| JP | 2013-068456 A | 4/2013 |
| JP | 2015-141811 A | 8/2015 |
| WO | 2016/035140 A1 | 3/2016 |

* cited by examiner

| ELEVATION | VACUUM PUMP 22 | COMPRESSION PUMP 23 | PRESSURE SENSOR 19c | HEAT RADIATION FAN 24 |
|---|---|---|---|---|
| 0~1000m | INPUT CURRENT: 1.0A<br>DIAPHRAGM REPLACEMENT CYCLE: 2 YEARS | PULSE MOTOR DRIVING SPEED: 2000pps<br>LUBRICATION CYCLE: 2 YEARS | THRESHOLD: 30kPa | INPUT VOLTAGE: 18V<br>FAN REPLACEMENT CYCLE: 4 YEARS |
| 1001~2000m | INPUT CURRENT: 1.5A<br>DIAPHRAGM REPLACEMENT CYCLE: 1.5 YEARS | PULSE MOTOR DRIVING SPEED: 3000pps<br>LUBRICATION CYCLE: 1.5 YEARS | THRESHOLD: 25kPa | INPUT VOLTAGE: 20V<br>FAN REPLACEMENT CYCLE: 3 YEARS |
| 2001~3000m | INPUT CURRENT: 1.8A<br>DIAPHRAGM REPLACEMENT CYCLE: 1 YEAR | PULSE MOTOR DRIVING SPEED: 3500pps<br>LUBRICATION CYCLE: 1.0 YEARS | THRESHOLD: 20kPa | INPUT VOLTAGE: 22V<br>FAN REPLACEMENT CYCLE: 2 YEARS |
| 3001~4000m | INPUT CURRENT: 2.0A<br>DIAPHRAGM REPLACEMENT CYCLE: 1 YEAR | PULSE MOTOR DRIVING SPEED: 4000pps<br>LUBRICATION CYCLE: 1.0 YEARS | THRESHOLD: 15kPa | INPUT VOLTAGE: 24V<br>FAN REPLACEMENT CYCLE: 1 YEAR |
| 4001m~ | OUT OF SPECIFICATION | OUT OF SPECIFICATION | OUT OF SPECIFICATION | OUT OF SPECIFICATION |

AUTOMATIC ANALYZER

TECHNICAL FIELD

The present invention relates to an automatic analyzer that performs qualitative and quantitative analysis of biological samples such as blood and urine.

BACKGROUND ART

An automatic analyzer that performs qualitative and quantitative analysis of a specific component included in a biological sample (hereinafter, referred to as "sample") such as blood or urine by adding pre-loaded plural reagents to the sample is essential in various kinds of diagnosis due to high reproducibility of analysis results and a high processing speed. For example, the automatic analyzer has a function of performing an analysis method (colorimetric analysis) of using a reagent that reacts with an analysis target component in a sample such that the color of reaction solution changes or performing an analysis method (immunoassay) of counting the number of markers using a reagent, the reagent obtained by adding a marker to a material that specifically combines directly or indirectly with an analysis target component.

Regarding this automatic analyzer, there is an individual difference in performance between the respective devices. Therefore, to reduce the influence of the individual difference, a technique of adjusting various parameters is known. For example, JP-A-H11-258244 (PTL 1) discloses a technique of detecting an abnormality of a dispenser based on a ratio between first pressure data and second pressure data, in which an internal pressure of a dispensing nozzle or a pipeline is detected by a pressure sensor while a predetermined liquid is dispensed through the pipeline or the dispensing nozzle by operating an absorption-discharge pump, and to detect an abnormality of the dispenser based on pressure data output from the pressure sensor, the first pressure data is detected by the pressure sensor when a reference liquid for detecting an abnormality is dispensed and the second pressure data is detected by the pressure sensor when the predetermined liquid is dispensed.

CITATION LIST

Patent Literature

PTL 1: JP-A-H11-258244

SUMMARY OF INVENTION

Technical Problem

However, recently, the economy of advanced nations has been developed, and the analysis using the automatic analyzer has been commonly used. Therefore, the automatic analyzer has been used in facilities of various environments including not only a plain area but also a mountainous area or a plateau, and an appropriate adjustment corresponding to the usage environment is necessary.

In the related art, the individual difference between the respective devices is controlled by comparing to reference data obtained from a reference solution. However, various parameters cannot be adjusted according to the usage environment of the automatic analyzer, and it is difficult to obtain an accurate analysis result. Since optimization of various parameters according to the usage environment is diverse, a long period of time is required to individually adjust the parameters.

The present invention has been made considering the above-described circumstances, and an object thereof is to provide an automatic analyzer that can easily adjust various parameters according to a usage environment of the device.

Solution to Problem

According to the present invention for achieving the object, there is provided an automatic analyzer including a reagent disk on which a plurality of reagent containers each containing a reagent used for analyzing a sample are loaded, a reaction disk on which a plurality of reaction containers where the sample and the reagent react with each other are arranged, a sample dispensing mechanism that dispenses the sample by absorbing the sample by dipping a dispensing nozzle into the sample contained in a sample container and discharging the absorbed sample into the reaction container of the reaction disk, a reagent dispensing mechanism that dispenses the reagent by absorbing the reagent by dipping a dispensing nozzle into the reagent contained in the reagent container and discharging the absorbed reagent into the reaction container of the reaction disk, and a reaction measuring unit that measures a reaction from a reaction solution of the sample and the reagent in the reaction container, the analyzer including: a parameter storage unit that stores a plurality of parameters of the automatic analyzer in association with each of elevations used in the automatic analyzers, the parameters being optimized for each of the elevations; an elevation information acquiring unit that acquires information of an elevation at which the automatic analyzer is provided; and a parameter setting unit that reads the parameters stored in the parameter storage unit and sets the read parameters to the automatic analyzer based on an elevation acquired by the elevation information acquiring unit.

Advantageous Effects of Invention

According to the present invention, various parameters can be easily adjusted according to a usage environment of the device.

DESCRIPTION OF EMBODIMENTS

Hereinafter, an embodiments of the present invention will be described with reference to the drawings.

Figure 1:
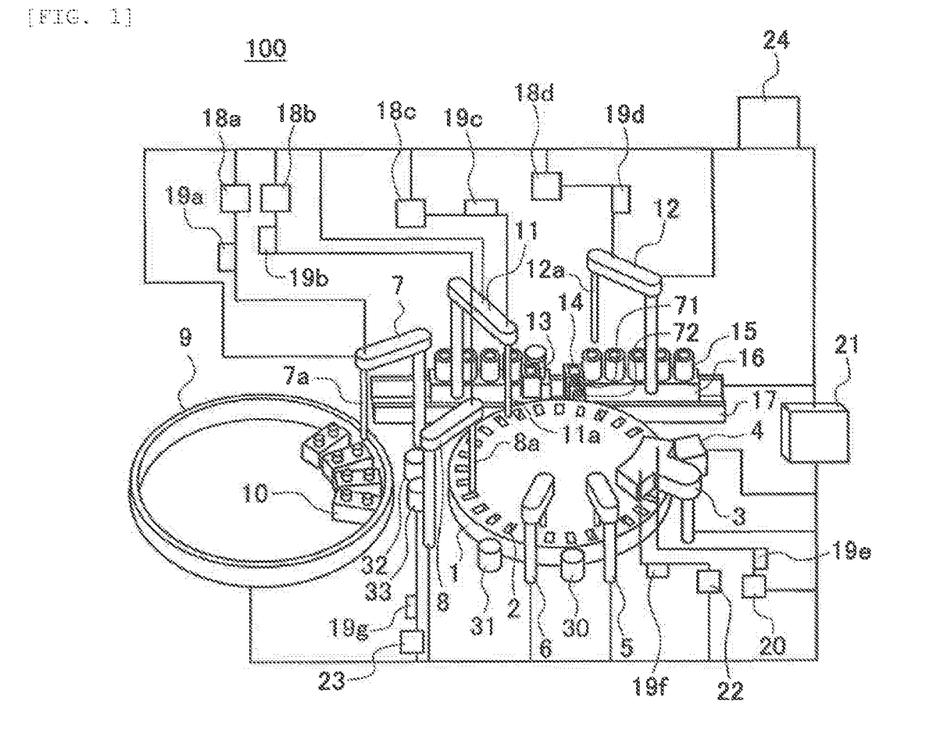
FIG. 1 is a diagram schematically illustrating an overall configuration of an automatic analyzer according to the present invention.
Figure 2:
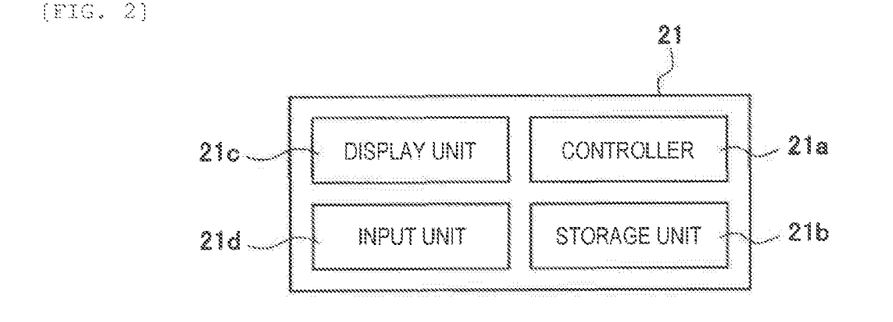
FIG. 2 is a functional block diagram schematically illustrating a configuration of a control device.

FIG. 1 is a diagram schematically illustrating an overall configuration of an automatic analyzer according to the embodiment. FIG. 2 is a functional block diagram schematically illustrating a configuration of a control device.

In FIG. 1, roughly, an automatic analyzer 100 includes a sample transport mechanism 17, a reagent disk 9, a reaction disk 1, sample dispensing mechanisms 11 and 12, reagent dispensing mechanisms 7 and 8, stirring mechanisms 5 and 6, a spectrophotometer 4, a reaction container cleaning mechanism 3, and a control device 21.

The sample transport mechanism 17 transports a rack 16 on which plural sample containers 15 each of which contains a biological sample (hereinafter, simply referred to as "sample") such as blood or urine as an analysis target are loaded, and transports the rack 16 to each of positions of the automatic analyzer 100 including sample absorption positions where the dispensing mechanisms for a sample (sample dispensing mechanisms) 11 and 12 absorb the samples from the sample containers 15.

The reagent disk 9 loads and transports plural reagent containers 10 each of which contains a reagent used for analyzing the sample in a circumferential direction, and rotates and transports the target reagent containers 10 to, for example, reagent dispensing positions where the dispensing mechanisms for a reagent (reagent dispensing mechanisms) 7 and 8 absorb the reagents.

The reaction disk 1 loads and transports plural reaction containers (reaction cells) 2 where the sample and the reagent are mixed and react with each other in a circumferential direction, and transports the reaction containers 2 to sample discharge positions where the sample dispensing mechanisms 11 and 12 discharge the samples or reagent discharge positions where the reagent dispensing mechanisms 7 and 8 discharge the reagents. The reaction disk 1 dips the reaction container 2 into a constant-temperature medium (not illustrated) to cause a reaction solution as a mixture of the reagent and the sample to react at a constant temperature, and rotates and transports the reaction container 2 to a position such as a stirring position where the reaction solution is stirred by the stirring mechanism 5 and 6, an analysis position where the reaction solution is measured (in the embodiment, transmitted light is measured using the spectrophotometer 4), or a cleaning position where the reaction container 2 is cleaned by the reaction container cleaning mechanism 3 after completion of analysis.

The sample dispensing mechanism 11 and 12 dispense the sample by dipping nozzles for dispensing sample (sample dispensing nozzles) 11a and 12a into the sample of the sample container 15 that is transported to a sample dispensing position by the sample transport mechanism 17 to absorb the sample and discharging the absorbed sample into the reaction container 2 of the reaction disk 1. The sample dispensing mechanism 11 is provided to be rotatable and movable up and down and can absorb the sample only from the opened sample container. Likewise, the sample dispensing mechanism 12 is also provided to be rotatable and movable up and down and can absorb the sample not only from the opened sample container but also from the closed sample container. A pump 18c for sample that absorbs and discharges the sample and a pressure sensor 19c that detects a pressure of the pump 18c for sample are connected to the sample dispensing nozzle 11a of the sample dispensing mechanism 11. A pump 18d for sample that absorbs and discharges the sample and a pressure sensor 19d that detects a pressure of the pump 18d for sample are connected to the sample dispensing nozzle 12a of the sample dispensing mechanism 12. In an operating range of the sample dispensing mechanism 12, a water absorption position 71 where water is absorbed by the sample dispensing nozzle 12a and a vacuum absorption position 72 where water or the like attached to the sample dispensing nozzle 12a is absorbed are provided.

Figure 3:
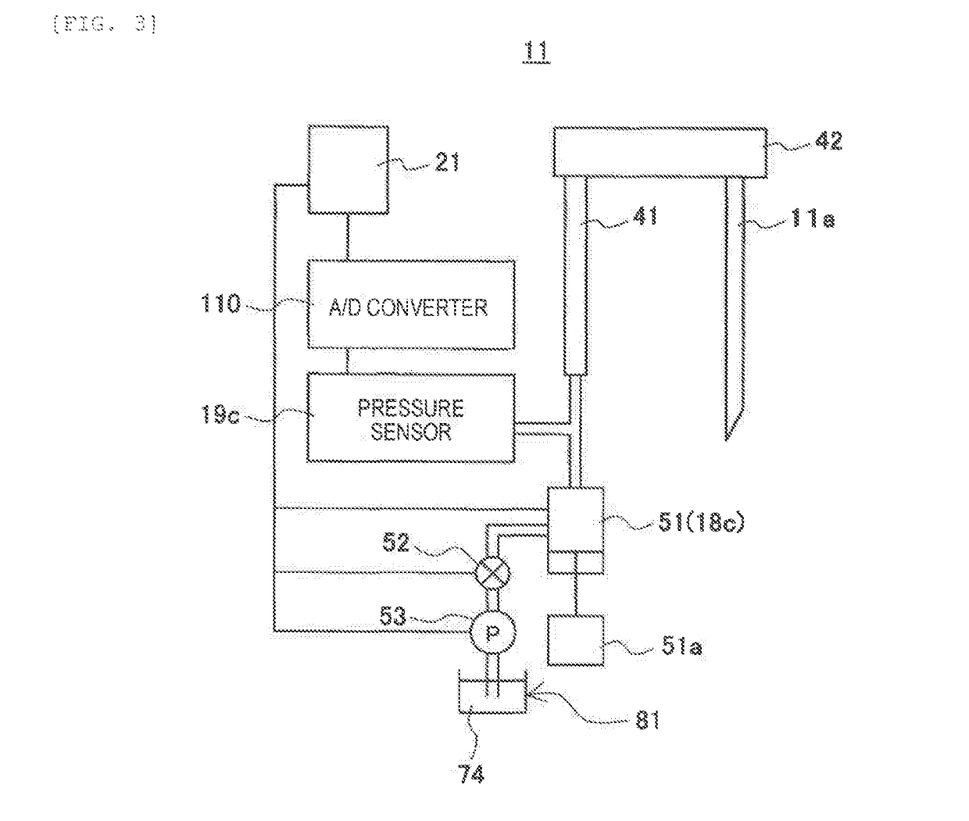
FIG. 3 is a diagram schematically illustrating a sample dispensing mechanism together with a peripheral configuration thereof.

FIG. 3 is a diagram schematically illustrating the sample dispensing mechanism together with a peripheral configuration thereof.

In FIG. 3, the sample dispensing mechanism 11 includes: an arm 42 that is arranged to extend in a horizontal direction; the sample dispensing nozzle 11a that is arranged at one end of the arm 42 such that a tip faces downward; and an arm driving mechanism 41 that is arranged at another end of the arm 42 and performs a rotation operation and a vertical operation of the arm 42 in the horizontal direction. A syringe pump 51 (the pump 18c for sample) is connected to the sample dispensing nozzle 11a through a pipeline (not illustrated) provided in the arm driving mechanism 41, and is driven by a syringe pump driving mechanism 51a. The pressure sensor 19c is provided in a flow path between the syringe pump 51 and the sample dispensing nozzle 11a, a variation in pressure in the flow path generated by driving the syringe pump driving mechanism 51a is measured through an A/D converter 110, and a waveform thereof can be monitored by the control device 21. A pump 53 that supplies system water 74 such as pure water stored in a water tank 81 into the syringe pump 51 and the sample dispensing nozzle 12a is connected to the syringe pump 51. In a pipeline that connects the pump 53 and the syringe pump 51, an electromagnetic valve 52 that opens and closes (switches between circulation and blocking) the pipeline is provided. The sample dispensing nozzle 11a dispenses the sample from the sample container 15 into the reaction container 2 by inserting a tip thereof into the sample in the sample container 15 using the arm driving mechanism 41 to absorb the sample and inserting the sample dispensing nozzle 11a into the reaction container 2 to discharge the sample. The sample in the sample container 15 is, for example, serum and may include a solid such as fibrin. When the solid is absorbed, accurate sample dispensation cannot be performed. Therefore, the pressure waveform during the absorption is monitored by the pressure sensor 19c to determine whether the sample including no solid is normally absorbed based on the generated differential pressure. The sample dispensing mechanism 12 has substantially the same configuration as the sample dispensing mechanism 11.

The reagent dispensing mechanisms 7 and 8 dispenses the reagent by dipping reagent dispensing nozzles 7a and 8a into the reagent in the reagent container 10 that is transported to the reagent dispensing position by the reagent disk 9 to absorb the reagent and discharging the absorbed reagent into the reaction container 2 of the reaction disk 1. A pump 18a for reagent that absorbs and discharges the reagent and a pressure sensor 19a that detects a pressure of the pump 18a for reagent are connected to the reagent dispensing nozzle 7a of the reagent dispensing mechanism 7. A pump 18b for reagent that absorbs and discharges the reagent and a pressure sensor 19b that detects a pressure of the pump 18b for reagent are connected to the reagent dispensing nozzle 8a of the reagent dispensing mechanism 8.

The stirring mechanisms 5 and 6 performs stirring to promote the reaction of the mixed solution (reaction solution) of the sample that is dispensed into the reaction container 2 by the sample dispensing mechanisms 11 and 12 and the reagent that is dispensed into the reaction container 2 by the reagent dispensing mechanisms 7 and 8.

In an operating range of the sample dispensing mechanisms 11 and 12, the reagent dispensing mechanisms 7 and 8, and the stirring mechanisms 5 and 6, cleaning tanks 13, 14, 30, 31, 32, and 33 for cleaning the sample dispensing nozzles 11a and 12a, the reagent dispensing nozzles 7a and 8a, and the stirring mechanism, respectively, are provided. A cleaning pump 20 for supplying a cleaning solution to each of the cleaning tanks 13, 14, 30, 31, 32, and 33, a pressure sensor 19e that detects a pressure of the cleaning pump 20, a compression pump 23 for supplying compressed air to each of the cleaning tanks 13, 14, 30, 31, 32, and 33, and a pressure sensor 19g that detects a pressure of the compression pump 23 are connected to the cleaning tanks 13, 14, 30, 31, 32, and 33. To simplify the drawing, some routes of the cleaning solution and the compressed air between the cleaning pump 20 and the compression pump 23 and each of the cleaning tanks 13, 14, 30, 31, 32, and 33 are not illustrated.

The spectrophotometer 4 measures an absorbance by spectrally measuring transmitted light of light emitted from a light source (not illustrated) to the reaction container 2 (in other words, the reaction solution). Based on the result of the absorbance measurement, colorimetric analysis is performed. In the embodiment, a case of a reaction measuring unit that measures transmitted light is described as an example. However, a reaction measuring unit that measures scattered light of light emitted to the reaction solution may be used to analyze the reaction solution based on the measurement result of the scattered light. As in immunoassay, a fluorescent material may be combined to cause the reaction solution to emit light such that the reaction solution is analyzed based on the measurement result of the amount of light emitted. That is, as the analysis principle of the reaction measuring unit, various forms can be considered. The analysis principle of the reaction measuring unit is not limited to the measurement of transmitted light or scattered light as long as a reaction can be measured from the reaction solution of the sample and the reagent.

The reaction container cleaning mechanism 3 cleans the reaction container 2 by absorbing the reaction solution from the reaction container 2 after completion of the measurement and discharging the cleaning solution or the like into the reaction container 2. In addition to the cleaning pump 20 for supplying the cleaning solution to the reaction container cleaning mechanism 3 and the pressure sensor 19e that detects a pressure of the cleaning pump 20, a vacuum pump 22 for absorbing the liquid in the reaction container 2 and a pressure sensor 19f that detects a pressure of the vacuum pump 22 are connected to the reaction container cleaning mechanism 3.

Each of the configurations of the automatic analyzer 100 is covered with a housing (not illustrated) and a cover, and a heat radiation fan 24 for heat radiation that radiates heat from the automatic analyzer 100 covered with the housing and the cover is provided.

Roughly, the control device 21 includes a controller 21a, a storage unit 21b, a display unit 21c, and an input unit 21d. The controller 21a controls an overall operation of the automatic analyzer 100, performs an analysis operation by controlling the operations of the respective configurations of the automatic analyzer 100 based on various parameters and a measurement program stored in the storage unit 21b, analyzes the sample based on the detection result of the spectrophotometer 4, stores a concentration of a predetermined component in the sample in the storage unit 21b as the analysis result, and outputs the analysis result to the display unit 21c or a printer (not illustrated).

The present application is applied to the automatic analyzer 100 having the above-described configuration, and includes: a parameter storage unit (corresponding to the storage unit 21b) that stores various parameters of the automatic analyzer 100 in association with each of elevations used in the automatic analyzers 100, the parameters being optimized for each of the elevations; an elevation information acquiring unit (corresponding to the input unit 21d) that acquires information of an elevation at which the automatic analyzer 100 is provided; and a parameter setting unit (corresponding to the controller 21a) that reads the parameters stored in the parameter storage unit (corresponding to the storage unit 21b) and sets the read parameters to the automatic analyzer 100 based on the elevation acquired by the elevation information acquiring unit (corresponding to the input unit 21d). According to the present invention, with this configuration, various parameters can be easily adjusted according to a usage environment of the device.

In the present invention having the above-described configuration, first, a parameter setting process that is performed by the controller 21a as the parameter setting unit in the embodiment will be described.

Figure 4:
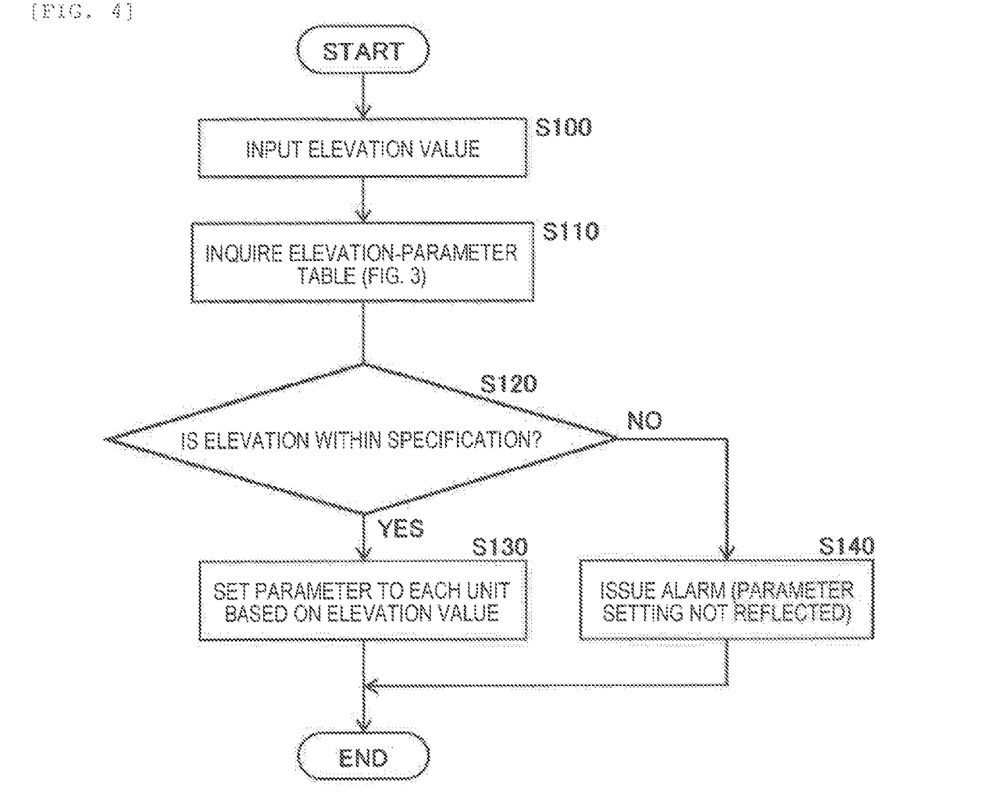
FIG. 4 is a process flow illustrating a parameter setting process.

FIG. 4 is a process flow illustrating the parameter setting process.

In FIG. 4, when an elevation of a facility where the automatic analyzer 100 is provided is input from an operator through the input unit 21d (Step S100), the controller 21a inquires an elevation-parameter table 500 (refer to FIG. 5 below) stored in the storage unit 21b about parameters corresponding to the input elevation (Step S110), and determines whether the input elevation are within specification (Step S120). When the determination result in Step S120 is YES, that is, when the parameters corresponding to the input elevation is within specification, in other words, when the elevation of the facility where the automatic analyzer 100 is within specification, the controller 21a applies the parameters corresponding to the input elevation to the automatic analyzer 100 (Step S130), and the process ends. When the determination result in Step S120 is NO, that is, when the parameters corresponding to the input elevation is out of specification, in other words, when the elevation of the facility where the automatic analyzer 100 is out of specification, the controller 21a gives a notification to the operator by stopping the application of the parameters and displaying an alarm indicating that the setting of the parameters is not reflected on the display unit 21c or the like (S140), and the process ends. In the description of Step S100, the operator such as a service man directly inputs an elevation value obtained by a global positioning system (GPS) to the input unit 21d through another information terminal included in the control device 21. However, the control device 21 may include a device that can acquire position (elevation) information, for example, a GPS device such that an elevation value obtained by the device can be automatically input.

Figure 5:
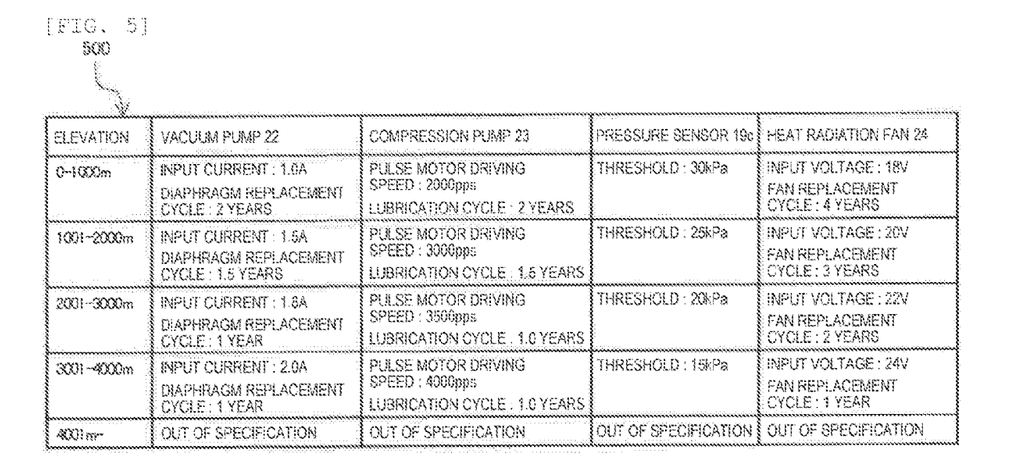
FIG. 5 is a diagram illustrating an example of an elevation-parameter table.

FIG. 5 is a diagram illustrating an example of the elevation-parameter table.

In FIG. 5, a case of parameter adjustment targets being the vacuum pump 22, the compression pump 23, the pressure sensor 19c, and the heat radiation fan 24 will be described. As described below, examples of the parameters include an input current to the vacuum pump 22, a replacement cycle of a component such as a diaphragm, a pulse motor driving speed for the compression pump 23, a lubrication cycle for a component such as a bearing, a threshold for determining whether the pressure sensor 19c is abnormal, an input voltage to the heat radiation fan 24, and a replacement cycle. These parameters are related to a control or management of the automatic analyzer. The input current, the motor driving speed, the input voltage are parameters related to the control of a component, and the replacement cycle and the threshold are parameters related to the management or operation of a component or abnormality detection.

In FIG. 4, parameters to be applied to the respective parameter adjustment targets are set per elevation of 1000 m. For example, regarding the vacuum pump 22, an output adjustment in a current control is assumed, and an input current to the vacuum pump 22 and a replacement cycle of a diaphragm corresponding to the operating time of the vacuum pump 22 are set. For example, at an elevation (0 m to 1000 m), the parameter of the input current is set as 1.0 A, the parameter of the diaphragm replacement cycle is set as 2 years. At an elevation (4001 m or higher), the parameters are out of specification and thus not set. The same shall be applied to other configurations. Regarding the compression pump 23, an adjustment of a compressed air pressure at a pulse motor driving speed is assumed, a driving speed applied to the pulse motor and a lubrication cycle of a component such as a bearing in which lubrication is required are set as the parameters. Regarding the pressure sensor 19c, a threshold used for determining whether clogging occurs due to foreign matter absorption based on an absorption pressure during sample absorption is set as the parameter. Regarding the heat radiation fan 24, an output adjustment in a voltage control is assumed, and an input voltage to the heat radiation fan 24 and a replacement cycle corresponding to the operating time of the heat radiation fan 24 are set.

Next, a setting principle of the elevation-parameter table 500 will be described.

Figure 6:
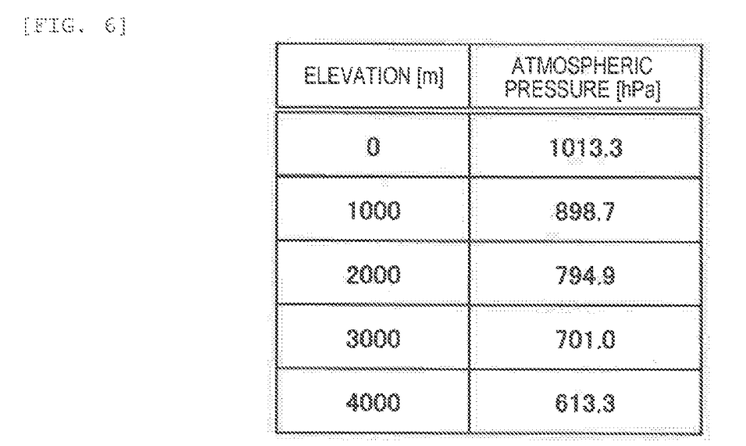
FIG. 6 is a diagram illustrating a relationship between an elevation and an atmospheric pressure.

FIG. 6 is a diagram illustrating a relationship between an elevation and an atmospheric pressure.

An atmospheric pressure P [hPa] at an elevation h [m] is obtained from the following (Equation 1) using an air pressure P0 [hPa] and a temperature t0 [° C.] at 0 m above sea level.

$$P = P0 \times (1 - 0.0065h/(t0+2732))^{5.258} \quad \text{(Equation 1)}$$

For example, when P0=1013.25 [hPa] and t0=15° C., a relationship between the elevation and the atmospheric pressure illustrated in FIG. 6 can be obtained. This way, as the elevation increases, the air pressure decreases. For example, it can be seen that the air pressure at an elevation of 3000 m is reduced by about 30% as compared to the air pressure at 0 m above sea level. Based on this relationship between the elevation and the air pressure, the elevation-parameter table 500 is set.

Figure 7:
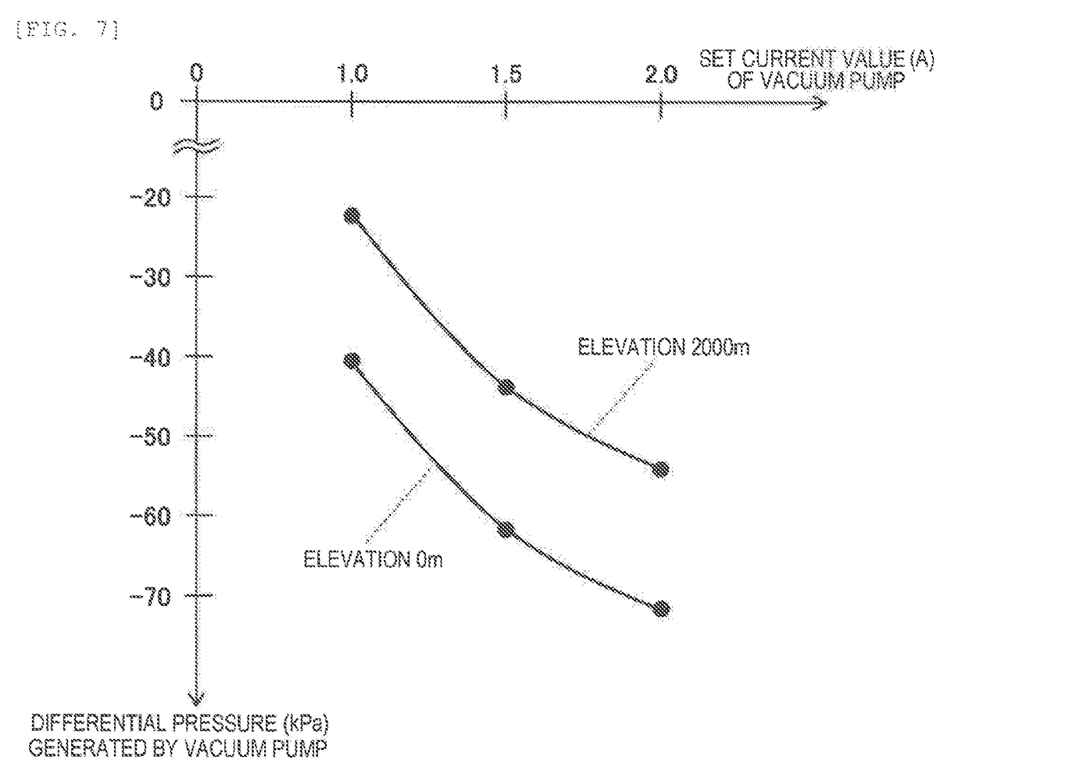
FIG. 7 is a diagram illustrating an example of a relationship between a set current value of a vacuum pump and a differential pressure generated by the vacuum pump.

FIG. 7 is a diagram illustrating an example of a relationship between a set current value of the vacuum pump and a differential pressure generated by the vacuum pump, in which the vertical axis represents the set current value [A] of the vacuum pump and the horizontal axis represents the differential pressure [kPa] generated by the vacuum pump. In FIG. 7, values at an elevation of 0 m and values at an elevation of 2000 m are compared to each other.

In FIG. 7, for example, assuming that the differential pressure required for absorbing the liquid in the reaction container 2 in the vacuum pump 22 used in the reaction container cleaning mechanism 3 or the like is −40 kPa, at an elevation of 0 m, the differential pressure (−40 kPa) can be generated at a set voltage of 1.0 A. On the other hand, at an elevation of 2000 m, the air pressure is reduced by about 20% (that is, air is thin) as compared to that at an elevation of 0 m. Therefore, even when the same vacuum pump 22 is used, only a differential pressure of −20 kPa can be generated at a set current value of 1.0 A. It can be seen that, to generate a differential pressure of −40 kPa at an elevation of 2000 m, the set current value is required to be 1.5 A. That is, at an elevation of 2000 m, by applying a set current value of 1.5 A as the parameter to generate a differential pressure of −40 kPa, for example, in a diaphragm pump, the driving speed per unit time increases, and a desired differential pressure can be generated. However, to generate a desired differential pressure in a highland at an elevation of 2000 m, the driving speed of the diaphragm per unit time increases. Therefore, it is necessary that the replacement cycle of the diaphragm is set to be short. Therefore, by setting optimum values of a driving time and a driving speed of the diaphragm, a valid driving time, a valid driving speed, and an expiration date regarding an elapsed period from the installation of the device, and the like to the elevation-parameter table 500 for the input elevation value and using these set values, an instruction for replacement can be given to the user or the service man at an appropriate timing. For example, regarding the diaphragm replacement cycle, the user or the service man inputs data of the time when the diaphragm is replaced and stores the data in the storage unit such that information that urges the user or the service man for the replacement can be displayed on the display unit immediately before or immediately after a predetermined period of 1 year to 2 years corresponding to the set replacement cycle. The time when the diaphragm is replaced may be automatically notified to the user or the service man.

Figure 8:
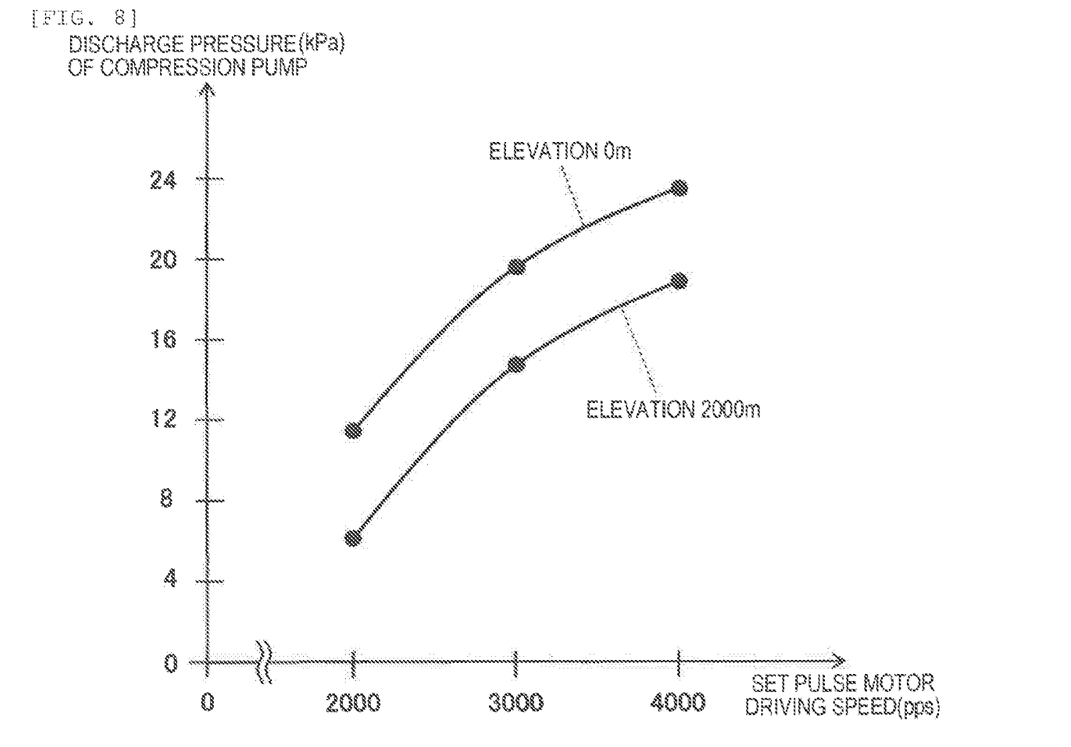
FIG. 8 is a diagram illustrating an example of a relationship between a set pulse motor driving speed of a compression pump and a discharge pressure generated by the compression pump.

FIG. 8 is a diagram illustrating an example of a relationship between a set pulse motor driving speed of the compression pump and a discharge pressure generated by the compression pump, in which the vertical axis represents the set pulse motor driving speed [pps] of the compression pump and the horizontal axis represents the discharge pressure [kPa] generated by the compression pump. In FIG. 8, values at an elevation of 0 m and values at an elevation of 2000 mare compared to each other.

In FIG. 8, for example, assuming that the compressed air discharge pressure required for removing water droplets attached to the reagent dispensing nozzle 8a in the compression pump 23 used in the cleaning tank 33 or the like is 20 kPa, at an elevation of 0 m, the discharge pressure (20 kPa) can be generated at a set pulse motor driving speed of 3000 pps. On the other hand, at an elevation of 2000 m, the air pressure is reduced by about 20% (that is, air is thin) as compared to that at an elevation of 0 m. Therefore, even when the same compression pump 23 is used, only a discharge pressure of 15 kPa can be generated at a set pulse motor driving speed 3000 pps. It can be seen that, to generate a discharge pressure of 20 kPa at an elevation of 2000 m, the set pulse motor driving speed is required to be 4000 pps. That is, at an elevation of 2000 m, by applying a set pulse motor driving speed of 4000 pps as the parameter to generate a discharge pressure of 20 kPa, for example, when bellows are moved using a linear driving mechanism, the amount in which the bellows are driven per unit time increases, and a desired discharge pressure can be generated. However, to generate a desired discharge pressure in a highland at an elevation of 2000 m, the driving speed of the linear mechanism increases, and lubricating oil or the like deteriorates. Therefore, it is necessary that the lubrication cycle is set to be short. Therefore, by setting optimum values of a driving time and a driving speed of the linear driving mechanism as the device, a valid driving time, a valid driving speed, and an expiration date regarding an elapsed period from the installation of the device, and the like to the elevation-parameter table 500 for the input elevation value and using these set values, an instruction for lubrication can be given to the user or the service man at an appropriate timing. For example, regarding the lubrication cycle, the user or the service man inputs data of the time when the linear driving mechanism is lubricated and stores the data in the storage unit such that information that urges the user or the service man for the lubrication can be displayed on the display unit immediately before or immediately after a predetermined period of 1 year to 2 years corresponding to the set lubrication cycle. The time when the linear driving mechanism is lubricated may be automatically notified to the user or the service man.

Figure 9:
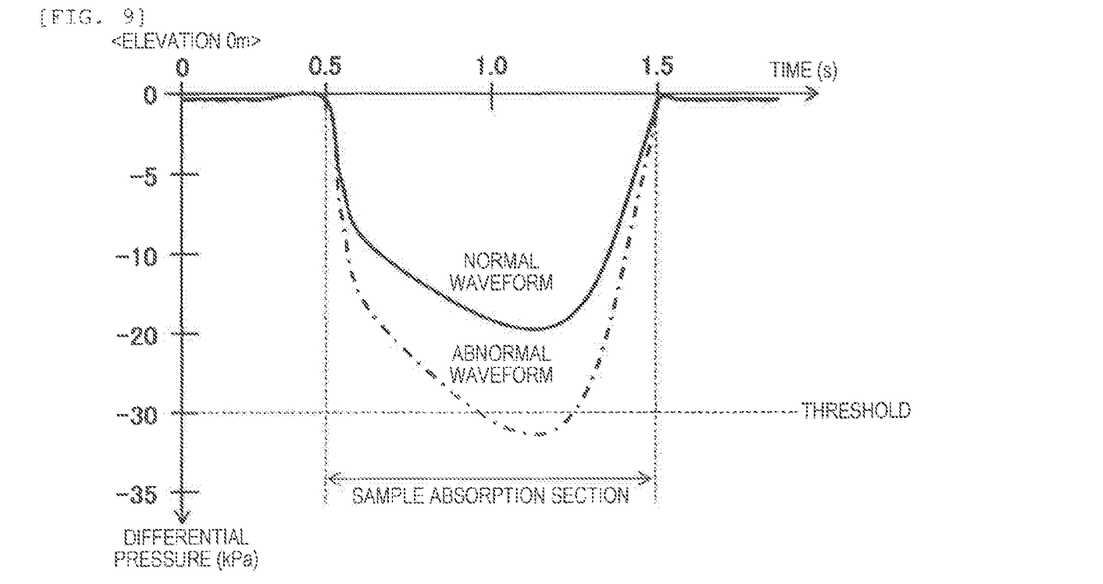
FIG. 9 is a diagram illustrating an example of a change over time of a detection result of the pressure sensor during sample absorption of the sample dispensing mechanism, in which a normal waveform and an abnormal waveform at an elevation of 0 m are compared to each other.
Figure 10:
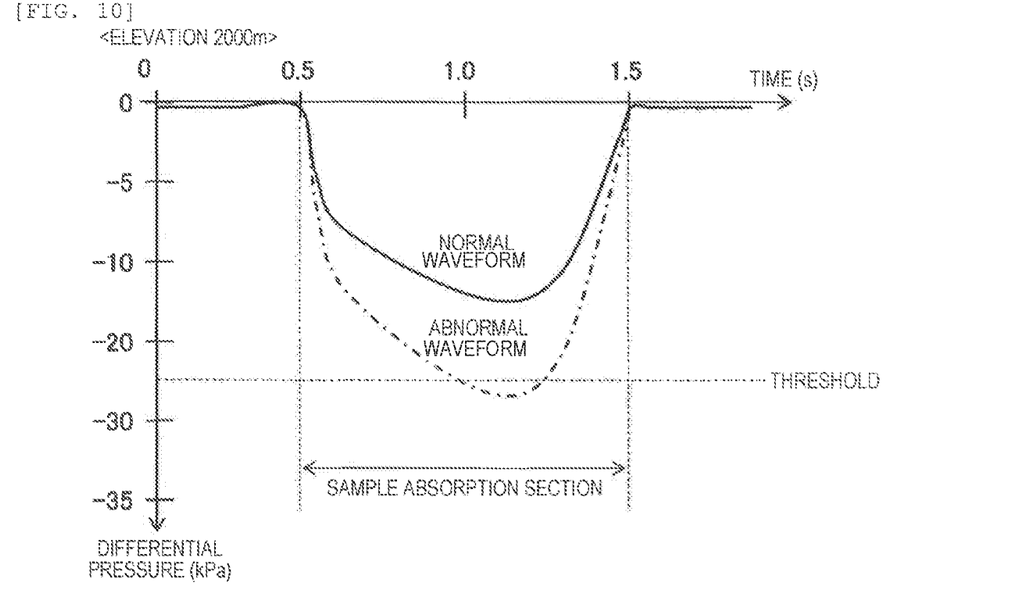
FIG. 10 is a diagram illustrating an example of a change over time of a detection result of the pressure sensor during sample absorption of the sample dispensing mechanism, in which a normal waveform and an abnormal waveform at an elevation of 2000 m are compared to each other.

FIGS. 9 and 10 are diagrams illustrating an example of a change over time of a detection result of the pressure sensor during sample absorption of the sample dispensing mechanism, in which the vertical axis represents the differential pressure [kPa] and the horizontal axis represents the time [s]. In FIG. 9, a normal waveform and an abnormal waveform at an elevation of 0 m are compared to each other. In FIG. 10, a normal waveform and an abnormal waveform at an elevation of 2000 m are compared to each other.

As illustrated in FIGS. 9 and 10, the differential pressure in an environment at an elevation of 2000 m is lower than that at an elevation of 0 m to reduce the air pressure, regardless of whether the waveform is a normal waveform (a waveform during the normal sample absorption) or an abnormal waveform (a waveform during an abnormal situation such as absorption of a sample including a solid). Therefore, it is presumed that the absorption determination at a preset threshold cannot be appropriately performed. Therefore, by setting a change in differential pressure caused by an increase in elevation to the elevation-parameter table 500 in advance and applying a threshold of 25 kPa as the parameter in the control device 21 regarding, for example, an input elevation value of 2000 m, appropriate absorption abnormality determination can be realized.

Figure 11:
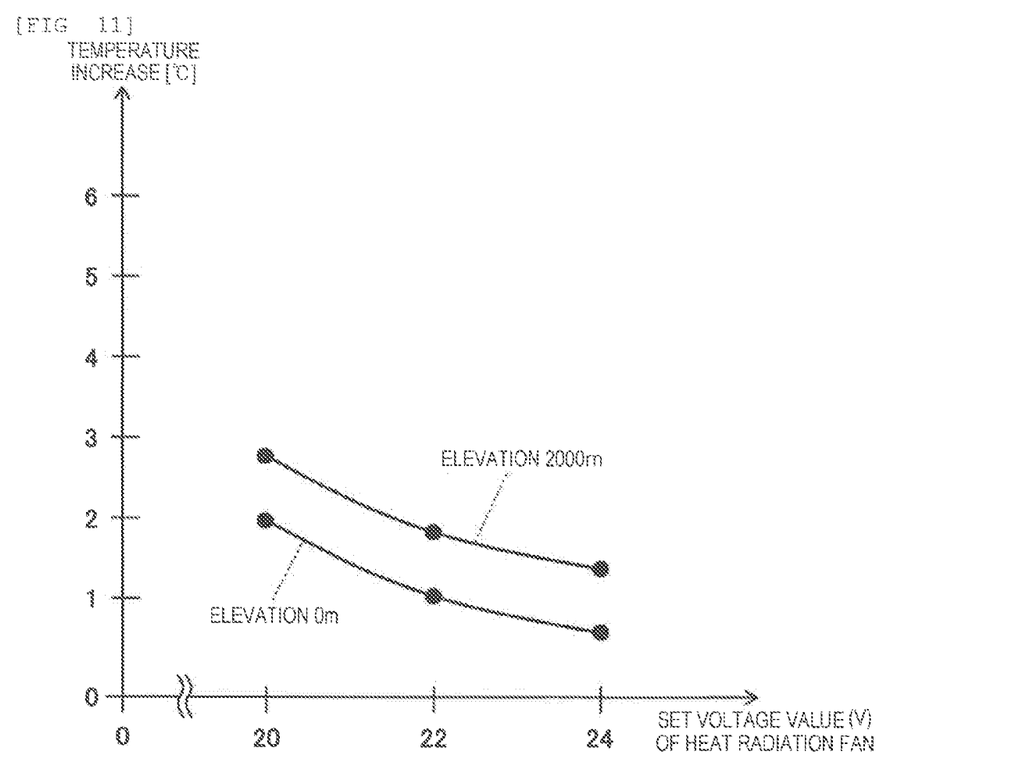
FIG. 11 is a diagram illustrating an example of a relationship between a set voltage value of a heat radiation fan and a temperature increase in the automatic analyzer.

FIG. 11 is a diagram illustrating an example of a relationship between a set voltage value of the heat radiation fan and a temperature increase in the automatic analyzer, in which the vertical axis represents the temperature increase [° C.] and the horizontal axis represents the set voltage value of the heat radiation fan. In FIG. 7, values at an elevation of 0 m and values at an elevation of 2000 m are compared to each other.

In FIG. 11, for example, when it is desired to control the temperature increase in the automatic analyzer 100 to be less than 2° C., at an elevation of 0 m, the temperature increase can be controlled to be less than 2° C. at a set voltage value 20 V of the heat radiation fan 24. On the other hand, at an elevation of 2000 m, the air pressure is reduced by about 20% (air is thin) as compared to that at an elevation of 0 m.

Even when the same heat radiation fan 24 is used, the heat exchanger effectiveness decreases, and the temperature increase in the automatic analyzer 100 can be controlled to be less than only 3° C. It can be seen that, to control the temperature increase to less than 2° C. at an elevation of 2000 m, the set voltage value is required to be 22 V. That is, at an elevation of 2000 m by applying a set voltage value of 22 V as the parameter to control the temperature increase to be less than 2° C., the temperature increase in the device can be constantly controlled without being affected by the elevation. However, to generate desired heat radiation performance in a highland at an elevation of 2000 m, the fan speed per unit time increases. Therefore, it is necessary that the replacement cycle is set to be short. Therefore, by setting optimum values of a driving time and a driving speed of the fan as the device, a valid driving time, a valid driving speed, and an expiration date regarding an elapsed period from the installation of the device, and the like to the elevation-parameter table 500 for the input elevation value and using these set values, an instruction for replacement can be given to the user or the service man at an appropriate timing. For example, regarding the fan replacement cycle, the user or the service man inputs data of the time when the fan is replaced and stores the data in the storage unit such that information that urges the user or the serviceman for the replacement can be displayed on the display unit immediately before or immediately after a predetermined period of 1 year to 4 years corresponding to the set replacement cycle. The time when the fan is replaced may be automatically notified to the user or the service man.

The effects of the embodiment having the above-described configuration will be described.

Therefore, the automatic analyzer may be used in facilities of various environments including not only a plain area but also a mountainous area or a plateau, and an appropriate adjustment corresponding to the usage environment is necessary. In the related art, the individual difference between the respective devices is controlled by comparing to reference data obtained from a reference solution. However, various parameters cannot be adjusted according to the usage environment of the automatic analyzer, and it is difficult to obtain an accurate analysis result. Since optimization of various parameters according to the usage environment is diverse, a long period of time is required to individually adjust the parameters.

On the other hand, the automatic analyzers 100 according to the embodiment includes: the storage unit 21b (parameter storage unit) that stores various parameters of the automatic analyzer 100 in association with each of elevations used in the automatic analyzers 100, the parameters being optimized for each of the elevations; the input unit 21d (elevation information acquiring unit) that acquires information of an elevation at which the automatic analyzer 100 is provided; and the controller 21a (parameter setting unit) that reads the parameters stored in the storage unit 21b and sets the read parameters to the automatic analyzer 100 based on the elevation acquired by the input unit 21d. Therefore, various parameters can be easily adjusted according to a usage environment of the automatic analyzer 100.

The present invention is not limited to the embodiment and includes various modification examples. For example, the embodiment has been described in detail to easily describe the present invention, and the present invention is not necessarily to include all the configurations described above. Some or all of the above-described respective configurations, functions, and the like may be realized, for example, by designing an integrated circuit. The respective configurations, functions, and the like may be realized by software by a processor interpreting and executing a program that realizes each of the functions.

REFERENCE SIGNS LIST

1: reaction disk
2: reaction container (reaction cell)
3: reaction container cleaning mechanism
4: spectrophotometer
5: stirring mechanism
6: stirring mechanism
7: reagent dispensing mechanism
7a: reagent dispensing nozzle
8: reagent dispensing mechanism
8a: reagent dispensing nozzle
9: reagent disk
10: reagent container
11: sample dispensing mechanism
11a: sample dispensing nozzle
12: sample dispensing mechanism
12a: sample dispensing nozzle
13, 14, 30, 31, 32, 33: cleaning tank
15: sample container
16: rack
17: sample transport mechanism
18a, 18b: pump for reagent
18c, 18d: pump for sample
19a, ..., 19g: pressure sensor
20: cleaning pump
21: control device
21a: controller
21b: storage unit
21c: display unit
21d: input unit
22: vacuum pump
23: compression pump
24: heat radiation fan
41: arm driving mechanism
42: arm
51: syringe pump
51a: syringe pump driving mechanism
52: electromagnetic valve
53: pump
71: water absorption position
72: vacuum absorption position
74: system water
81: water tank
100: automatic analyzer
110: A/D converter
500: elevation-parameter table

The invention claimed is:

1. An automatic analyzer comprising:
a reagent disk on which a plurality of reagent containers each containing a reagent used for analyzing a sample are loaded;
a reaction disk on which a plurality of reaction containers where the sample and the reagent react with each other are arranged;
a sample dispensing mechanism that dispenses the sample by absorbing the sample by dipping a sample dispensing nozzle into the sample contained in a sample container and discharging the absorbed sample into the reaction container of the reaction disk by using a syringe pump, the sample dispensing mechanism including a pressure sensor provided in a flow path between the syringe pump and the sample dispensing nozzle;
a reagent dispensing mechanism that dispenses the reagent by absorbing the reagent by dipping a reagent dispensing nozzle into the reagent contained in the reagent container and discharging the absorbed reagent into the reaction container of the reaction disk;
a reaction measuring unit that measures a reaction from a reaction solution of the sample and the reagent in the reaction container;
a storage device configured to store a plurality of parameters of the automatic analyzer in association with each of a plurality of stored elevations in which the automatic analyzer is used, the plurality of parameters being optimized for each of the plurality of stored elevations, respectively; and
a processor configured to:
acquire information of an input elevation at which the automatic analyzer is provided;
read a parameter of the plurality of parameters stored in the storage device for absorption abnormalities determination and set the read parameter to the automatic analyzer based on the input elevation; and
determine the absorption abnormalities of the sample dispensing nozzle using pressures detected by the pressure sensor and the parameter set to the automatic analyzer,
wherein at least one of the plurality of parameters of the automatic analyzer stored in association with each of the plurality of stored elevations includes information of a replacement cycle of a component included in the automatic analyzer.

2. The automatic analyzer according to claim 1, wherein the processor is further configured to obtain the information of the input elevation by receiving an input of the input elevation from an operator or by calculating the input elevation based on automatic acquisition of a position.

3. The automatic analyzer according to claim 1, wherein the storage device is configured to store a parameter table in which one value is associated with one of the plurality of stored elevations for each of the plurality of parameters.

4. The automatic analyzer according to claim 1, wherein when the input elevation at which the automatic analyzer is provided is out of specification, an alarm indicating that a setting of at least one of the plurality of parameters is not reflected is issued.

5. The automatic analyzer according to claim 1, wherein the absorption abnormality determination is a clogging determination associated with foreign object absorption.

* * * * *